(12) United States Patent
Fujiwara

(10) Patent No.: US 11,946,228 B2
(45) Date of Patent: Apr. 2, 2024

(54) SAFETY DEVICE FOR REVOLVING-TYPE WORK MACHINE

(71) Applicant: KOBELCO CONSTRUCTION MACHINERY CO., LTD., Hiroshima (JP)

(72) Inventor: Sho Fujiwara, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 671 days.

(21) Appl. No.: 17/252,540

(22) PCT Filed: Jun. 20, 2019

(86) PCT No.: PCT/JP2019/024566
§ 371 (c)(1),
(2) Date: Dec. 15, 2020

(87) PCT Pub. No.: WO2020/012911
PCT Pub. Date: Jan. 16, 2020

(65) Prior Publication Data
US 2021/0262203 A1 Aug. 26, 2021

(30) Foreign Application Priority Data
Jul. 12, 2018 (JP) .................................. 2018-132210

(51) Int. Cl.
*B60W 30/09* (2012.01)
*B60W 50/14* (2020.01)
(Continued)

(52) U.S. Cl.
CPC ............... *E02F 9/24* (2013.01); *B60W 30/09* (2013.01); *B60W 50/14* (2013.01); *E02F 9/2033* (2013.01);
(Continued)

(58) Field of Classification Search
CPC ... E02F 9/24; E02F 9/2033; E02F 9/26; E02F 3/32; B60W 30/09; B60W 50/14; B60W 2050/143; B60W 2300/17
See application file for complete search history.

(56) References Cited

U.S. PATENT DOCUMENTS 5,198,800 A 3/1993 Tozawa et al.
9,903,099 B2 2/2018 Chang
(Continued)

FOREIGN PATENT DOCUMENTS

EP 2 955 914 A1 12/2015
JP 4-52330 A 2/1992
(Continued)

OTHER PUBLICATIONS

International Search Report dated Aug. 13, 2019 in PCT/JP2019/024566 filed on Jun. 20, 2019, 2 pages.
(Continued)

*Primary Examiner* — Yazan A Soofi
*Assistant Examiner* — Naeem Taslim Alam
(74) *Attorney, Agent, or Firm* — Oblon, McClelland, Maier & Neustadt, L.L.P.

(57) ABSTRACT

A safety apparatus of a work machine includes: obstacle sensors provided in the upper revolving body; a revolving angle detector; an upper-side coordinate position calculation section that calculates an upper-side coordinate position of the obstacle in the upper-side coordinate system using the upper revolving body as a reference; a lower-side judgment area setting section that sets a lower-side judgment area in the lower-side coordinate system using the lower traveling body as a reference; a coordinate transformation section that transforms one of the upper-side coordinate position and the position of the lower-side judgment area into the other coordinate system to unify the coordinate system; a lower-
(Continued)

side approach judgment section that judges whether an obstacle exists within the lower-side judgment area in the unified coordinate system; and a safety operation command section that outputs a safety operation command based on the judgment result.

4 Claims, 15 Drawing Sheets

(51) Int. Cl.
 *E02F 9/20* (2006.01)
 *E02F 9/24* (2006.01)
 *E02F 9/26* (2006.01)
 *E02F 3/32* (2006.01)

(52) U.S. Cl.
 CPC ......... *E02F 9/26* (2013.01); *B60W 2050/143* (2013.01); *B60W 2300/17* (2013.01); *E02F 3/32* (2013.01)

(56) References Cited

U.S. PATENT DOCUMENTS

2013/0222573 A1* 8/2013 Onuma .................. E02F 9/24
  348/82
2014/0111648 A1* 4/2014 Ishimoto ................ B60R 1/00
  348/148
2017/0286763 A1 10/2017 Fukuda et al.
2018/0080198 A1* 3/2018 Machida ................ E02F 9/16
2019/0241124 A1* 8/2019 Izumikawa ............ B60R 11/04

FOREIGN PATENT DOCUMENTS

| JP | 9-71965 A | 3/1997 |
|---|---|---|
| JP | 2001-262628 A | 9/2001 |
| JP | 2008-95307 A | 4/2008 |
| JP | 2008-163719 A | 7/2008 |
| JP | 2011-28729 A | 2/2011 |
| JP | 2011-162993 A | 8/2011 |
| JP | 2012-107395 A | 6/2012 |
| JP | 2017-206952 A | 11/2017 |
| WO | WO 2012/053105 A1 | 4/2012 |

OTHER PUBLICATIONS

Extended European Search Report dated Jul. 22, 2021 in corresponding European Patent Application No. 19834955.7, 8 pages.

* cited by examiner

SAFETY DEVICE FOR REVOLVING-TYPE WORK MACHINE

TECHNICAL FIELD

The present invention relates to an apparatus installed on a work machine such as a hydraulic excavator including a lower traveling body and an upper revolving body mounted on the lower traveling body so as to be revolvable, the apparatus performing a control for safety of the work machine based on the existence of an obstacle around the work machine.

BACKGROUND ART

Conventionally, as a safety apparatus installed on a revolving type work machine, known is a safety apparatus described in Patent Literature 1. The apparatus comprises a plurality of obstacle sensors, a plurality of direction detecting switches, and a controller. The plurality of obstacle sensors are disposed in the rear of the upper revolving body of the work machine to sense obstacles located rearward thereof. The direction detecting switch detects that the upper revolving body is directed forward or backward to the lower traveling body. The controller, when any of the plurality of obstacle sensors detects an obstacle and the direction detection switch detects that the upper revolving body is directed forward or backward of the lower traveling body, performs a control to prevent the lower traveling body from traveling motion in a direction in which the lower traveling body approaches the obstacle.

The apparatus described in Patent Literature 1 involves a problem of being unable to execute a safety operation when the upper revolving body is not in a posture directed frontward or rearward of the lower traveling body, for example, when the upper revolving body is in a laterally directed posture where the upper revolving body is rotated 90° from the normal position to the lower traveling body. Even when the upper revolving body is in such a posture, there is also a possibility that an obstacle existing on the front side or rear side of the lower traveling body with respect to the traveling direction of the lower traveling body (in particular, the existence of the obstacle at a position so deviated from the front view of the operator as to be difficult to see) may come into contact with the work machine due to the traveling of the lower traveling body. Hence, also in such a case, it is preferable to execute an appropriate safety operation.

Such a problem may be solved by mounting the obstacle sensor not to the upper revolving body hut the lower traveling body, but this makes it very difficult to perform the wiring for electrically connecting the obstacle sensor to the power supply and the controller, which are normally mounted on the upper revolving body. Besides, mounting the obstacle sensor on the lower traveling body increases the possibility that dust or mud or the like scattered during the traveling affects the obstacle sensor, which is likely to be a factor of operation failure in conjunction with the above difficulty of the wiring.

CITATION LIST

Patent Literature

Patent Literature 1: Japanese Unexamined Patent Application No. 2001-262628

SUMMARY OF INVENTION

An object of the present invention is to provide a safety apparatus installed on a revolving type work machine including a lower traveling body and an upper revolving body, the apparatus being capable of performing an accurate safety control regardless of the posture of the upper revolving body while an obstacle sensor for detecting an obstacle is disposed on the upper revolving body.

Provided is a safety apparatus installed on a work machine including a lower traveling body capable of traveling on the ground and an upper revolving body mounted on the lower traveling body so as to be revolvable, the safety apparatus including: an obstacle sensor provided in a specific portion of the upper revolving body to detect an obstacle around the work machine; a revolving angle detector that detects a revolving angle of the upper revolving body to the lower traveling body; an upper-side coordinate position calculation section that calculates an upper-side coordinate position that is a position of the obstacle detected by the obstacle sensor, the position being a position in a coordinate system using the upper revolving body as a reference; a lower-side judgment area setting section that sets a lower-side judgment area for judging an approach of the obstacle at least in the periphery of the lower traveling body using the lower traveling body as a reference; a coordinate transformation section that transforms one position of the upper-side coordinate position and a position of the lower-side judgment area into a position in the coordinate system to which the other position of the upper-side coordinate position and the position of the lower-side judgment area belongs, based on the revolving angle detected by the revolving angle detector, to thereby unify a coordinate system for specifying the position of the obstacle and a coordinate system for specifying the position of the lower-side judgment area; a lower-side approach judgment section that judges whether or not the obstacle exists within the lower-side judgment area in the coordinate system unified by the coordinate transformation section; and a safety operation command section that outputs a safety operation command for making the work machine perform a safety operation when the lower-side approach judgment section judges that the obstacle exists within the lower-side judgment area.

DESCRIPTION OF EMBODIMENTS

There will be described preferred embodiments of the invention with reference to the drawings.

Figure 1:
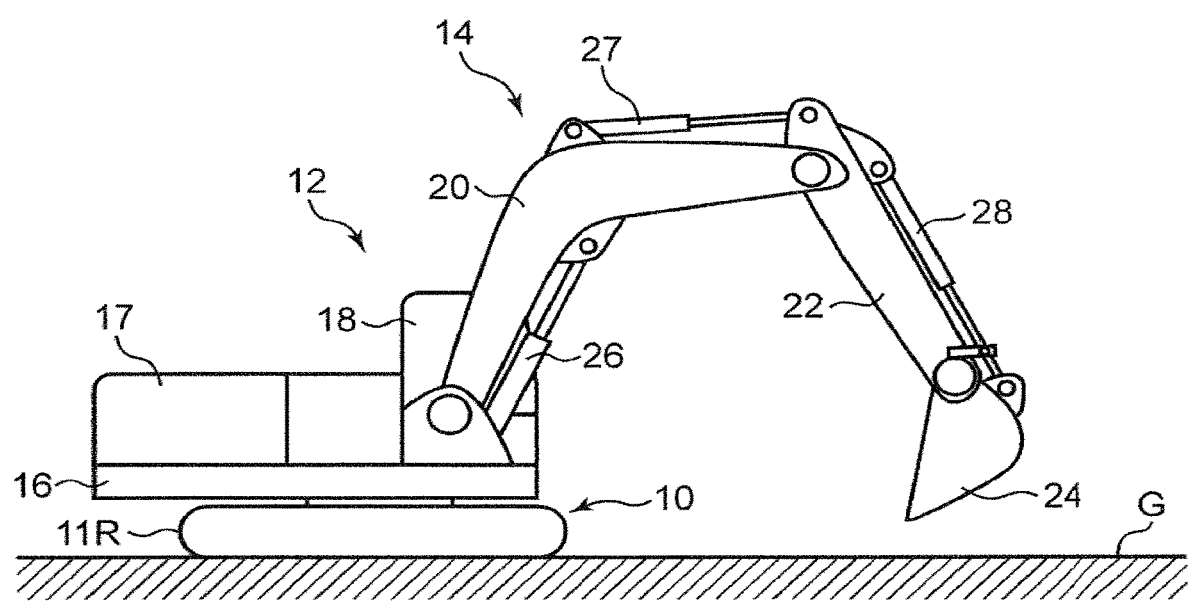
FIG. 1 is a side view showing a hydraulic excavator which is an example of a revolving type work machine on which a safety apparatus according to each embodiment of the present invention is installed.
Figure 2:
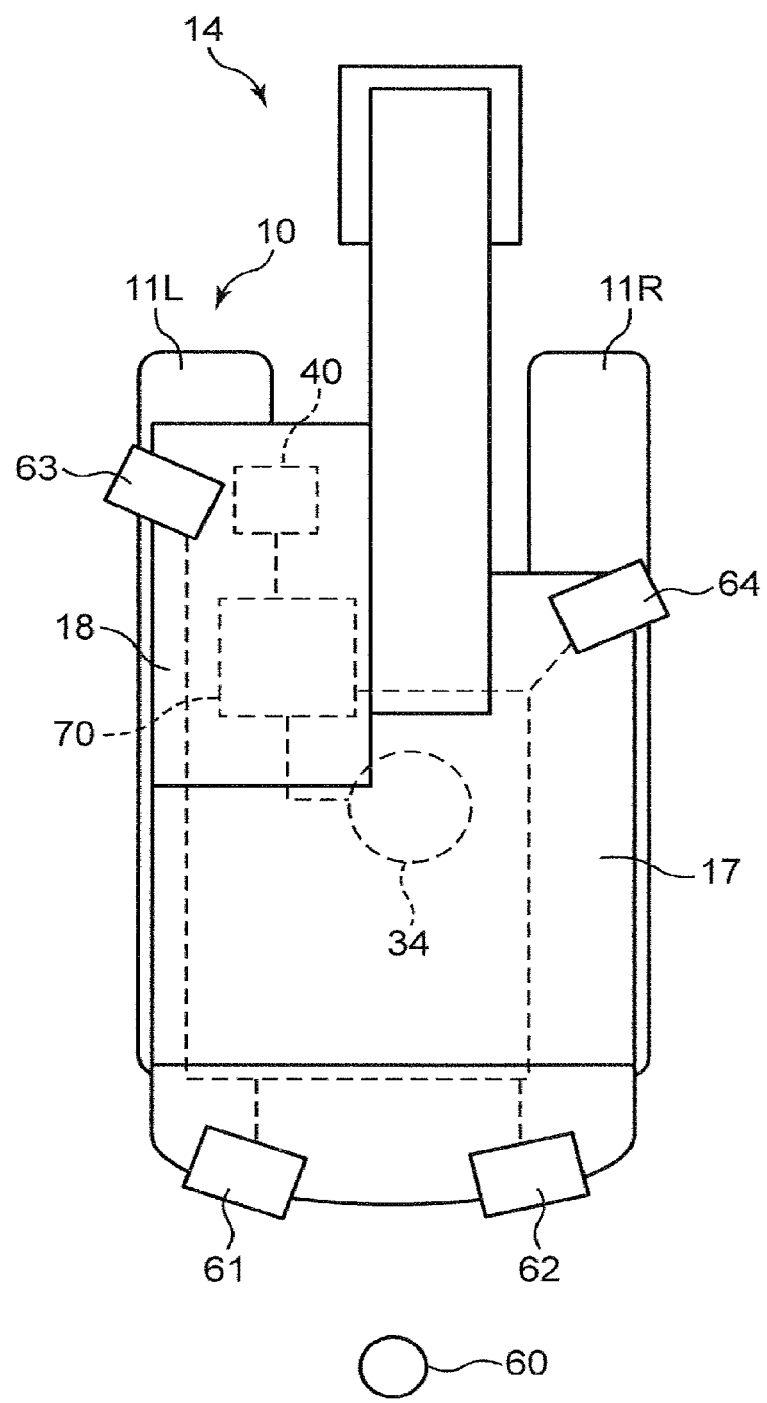
FIG. 2 is a plan view showing the hydraulic excavator and the arrangement of an obstacle sensor and the like on the hydraulic excavator.

FIGS. 1 and 2 show a hydraulic excavator which is an example of a work machine on which a safety apparatus according to the respective embodiments described below is mounted. The work machine to which the safety apparatus according to the present invention is applied is not limited to the hydraulic excavator. The present invention can be broadly applied to a work machine including a lower traveling body and an upper revolving body mounted on the lower traveling body so as to be revolvable, the work machine being required to perform a safety operation based on the existence of an obstacle around the work machine.

Figure 3:
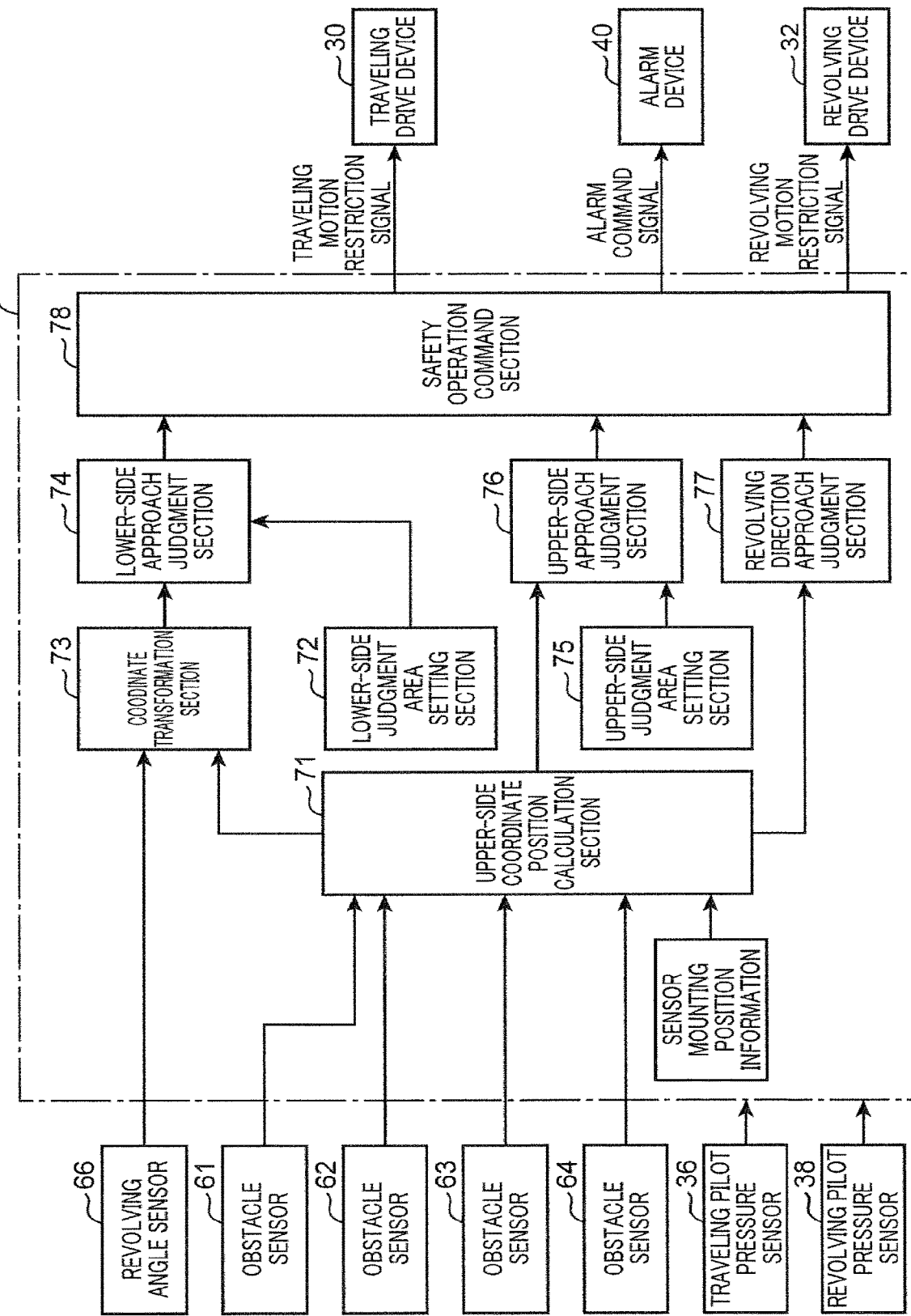
FIG. 3 is a block diagram showing a safety apparatus according to a first embodiment of the present invention.

The hydraulic excavator includes a lower traveling body 10 capable of traveling on the ground G, an upper revolving body 12 mounted on the lower traveling body 10 so as to be capable of performing a revolving motion relative to the lower traveling body 10, and a plurality of devices shown in FIG. 3. The plurality of devices include a traveling drive device 30, a revolving drive device 32, and an alarm device 40.

The lower traveling body 10 includes a traveling device. The traveling device includes a pair of left and right crawlers 11L and 11R, and operates to move the lower traveling body 10 and the upper revolving body 12 thereon (in this embodiment, the entire hydraulic excavator) along the ground G.

The upper revolving body 12 includes a revolving frame 16 and a plurality of elements mounted thereon. The plurality of elements include a working device 14, an engine room 17 containing the engine, and a cab 18 which is an operator's room.

The working device 14 is capable of performing motions for excavation work or other necessary work. The working device 14 includes a boom 20, an arm 22, a bucket 24, and a plurality of hydraulic cylinders. The plurality of hydraulic cylinders include a boom cylinder 26 for actuating the boom 20, an arm cylinder 27 for actuating the arm 22, and a bucket cylinder 28 for actuating the bucket 24. The boom 20 has a proximal end portion and a distal end portion opposite thereto, the proximal end portion being supported on the front end of the revolving frame 16 so as to be raisable and lowerable, that is, movable rotationally about a horizontal axis. The arm 22 has a proximal end, which is attached to the distal end portion of the boom 20 movably rotationally about a horizontal axis, and a distal end portion opposite to the proximal end. The bucket 24 is attached to the distal end portion of the arm 22 movably rotationally about a horizontal axis.

The traveling drive device 30 drives the crawlers 11L and 11R in both forward and backward directions so as to enable the lower traveling body 10 to traveling in any direction of frontward and rearward directions. The traveling drive device 30 is formed of, for example, a hydraulic circuit that includes a hydraulic pump, left and right traveling motors, left and right traveling control valves, and a traveling pilot circuit. The hydraulic pump is driven by an engine to discharge hydraulic oil. Each of the left and right traveling motors is formed of a hydraulic motor, which is rotated in both forward and reverse directions by supply of hydraulic oil discharged from the hydraulic pump to thereby drive the left and right crawlers 11L and 11R in both forward and backward directions. The left and right traveling control valves are operated to open so as to control a supply direction and a flow rate of hydraulic fluid from the hydraulic pump to the left and right traveling motors, respectively.

The traveling pilot circuit includes left and right traveling remote-control valves disposed in the cab 18, left and right traveling pilot lines connecting the left and right traveling remote-control valves with the left and right traveling control valves, respectively, traveling restriction solenoid valves provided in the middle of the left and right traveling pilot lines, respectively, and left and right traveling pilot pressure sensors 36 as shown in FIG. 3. The left and right traveling remote-control valves receive respective traveling command operations applied by an operator to instruct the traveling of the lower traveling body 10, and open so as to allow respective traveling pilot pressures corresponding to the traveling command operations to be supplied to the left and right traveling control valves through the left and right traveling pilot lines, respectively. The traveling restriction solenoid valves are operated by input of traveling motion restriction signals to reduce the traveling pilot pressures that are input to the left and right traveling control valves, respectively. The left and right traveling pilot pressure sensors 36 detect respective traveling pilot pressures supplied from the left and right traveling remote-control valves to the left and right traveling control valves, and generate and output respective pilot pressure detection signals, each of which is an electric signal corresponding to the traveling pilot pressure.

The revolving drive device 32 drives the upper revolving body 12 so as to revolve the upper revolving body 12 in both left and right directions to the lower traveling body 10. The revolving drive device 32 is formed of, for example, a hydraulic circuit that includes the hydraulic pump, a revolving motor 34 shown in FIG. 2, a revolving control valve, and a revolving pilot circuit. The revolving motor 34 can be rotated in both forward and reverse directions by supply of hydraulic fluid discharged from the hydraulic pump to thereby revolve the upper revolving body 12 in both left revolving direction and right revolving direction. The revolving control valve is operated to open so as to control the direction and flow rate of hydraulic fluid from the hydraulic pump to the revolving motor 34.

The revolving pilot circuit includes a revolving remote-control valve disposed in the cab 18, a revolving pilot line connecting the revolving remote-control valve and the revolving control valve to each other, a revolving control solenoid valve provided in the middle of the revolving pilot line, and a revolving pilot pressure sensor 38 shown in FIG. 3. The revolving remote-control valve receives a revolving command operation applied by an operator to instruct the revolution of the upper revolving body 12, and opens to allow the revolving pilot pressure corresponding to the revolving command operation to be supplied to the revolving control valve through the revolving pilot line. The revolving control solenoid valve is operated, by a revolving motion restriction signal, to reduce the revolving pilot pressure that is input to the revolving control valve. The revolving pilot pressure sensor 38 detects the revolving pilot pressure supplied from the revolving remote-control valve to the revolving control valve, and outputs an electrical signal corresponding to the revolving pilot pressure.

The alarm device 40 is provided in the cab 18 as shown in FIG. 2, and performs a necessary alarm operation (e.g., lighting of the alarm lamp and generation of alarm sound) by input of an alarm command signal thereto.

The hydraulic excavator further includes a safety apparatus as shown in FIG. 3. The safety apparatus detects the existence of an obstacle 60 around the hydraulic excavator, for example, as shown in FIG. 2, and makes the hydraulic excavator, based on the detection result, perform a safety operation to prevent the obstacle 60 from coming contact with the lower traveling body 10 and the upper revolving body 12. Specifically, the safety apparatus according to this embodiment includes a plurality of obstacle sensors 61, 62, 63, 64 (four sensors in the example shown in FIG. 2) as shown in FIGS. 2 and 3, a revolving angle sensor 66, and a controller 70.

The plurality of obstacle sensors 61 to 64, which are disposed in respective setting portions that are set in the outer periphery of the upper revolving body 12, detects the existence of the obstacle 60 and generates an obstacle detection signal that is an electrical signal corresponding to the relative position of the obstacle 60 to the setting portion where each of the obstacle sensors 61 to 64 is disposed to input the signal to the controller 70. Each of the plurality of obstacle sensors 61 to 64 is composed of, for example, an infrared camera or an ultrasonic sensor.

FIG. 2 illustrates the arrangement of the plurality of obstacle sensors 61 to 64. In FIG. 2, the obstacle sensors 61 and 62 are disposed at left and right positions on the rear end surface of the upper revolving body 12 to mainly detect obstacles located on the rear side of the upper revolving body 12, for example, an obstacle 60 shown in FIG. 2. The obstacle sensor 63 is disposed on the front left side surface of the cab 18 to mainly detect an obstacle located on the left side of the upper revolving body 12. The obstacle sensor 64 is disposed on the right front side surface of the upper revolving body 12 to mainly detect an obstacle located on the right side of the upper revolving body 12.

The revolving angle sensor 66 detects a revolving angle θ of the upper revolving body 12 relative to the lower traveling body 10, and generates a revolving detection signal, which is an electrical signal corresponding to the revolving angle θ, to input the signal to the controller 70.

The controller 70 takes in respective detection signals that are input from the traveling pilot pressure sensors 36, the revolving pilot pressure sensor 38, the obstacle sensors 61 to 64 and the revolving angle sensor 66, respectively, and outputs a safety operation command for making the hydraulic excavator perform safety operation, based on the detection signal. The controller 70 is formed of, for example, a computer, including, as function for performing the safety control, an upper-side coordinate position calculation section 71 as shown in FIG. 3, a lower-side judgment area setting section 72, a coordinate transformation section 73, a lower-side approach judgment section 74, an upper-side judgment area setting section 75, an upper-side approach judgment section 76, a revolving direction approach judgment section 77, and a safety operation command section 78.

Figure 5:
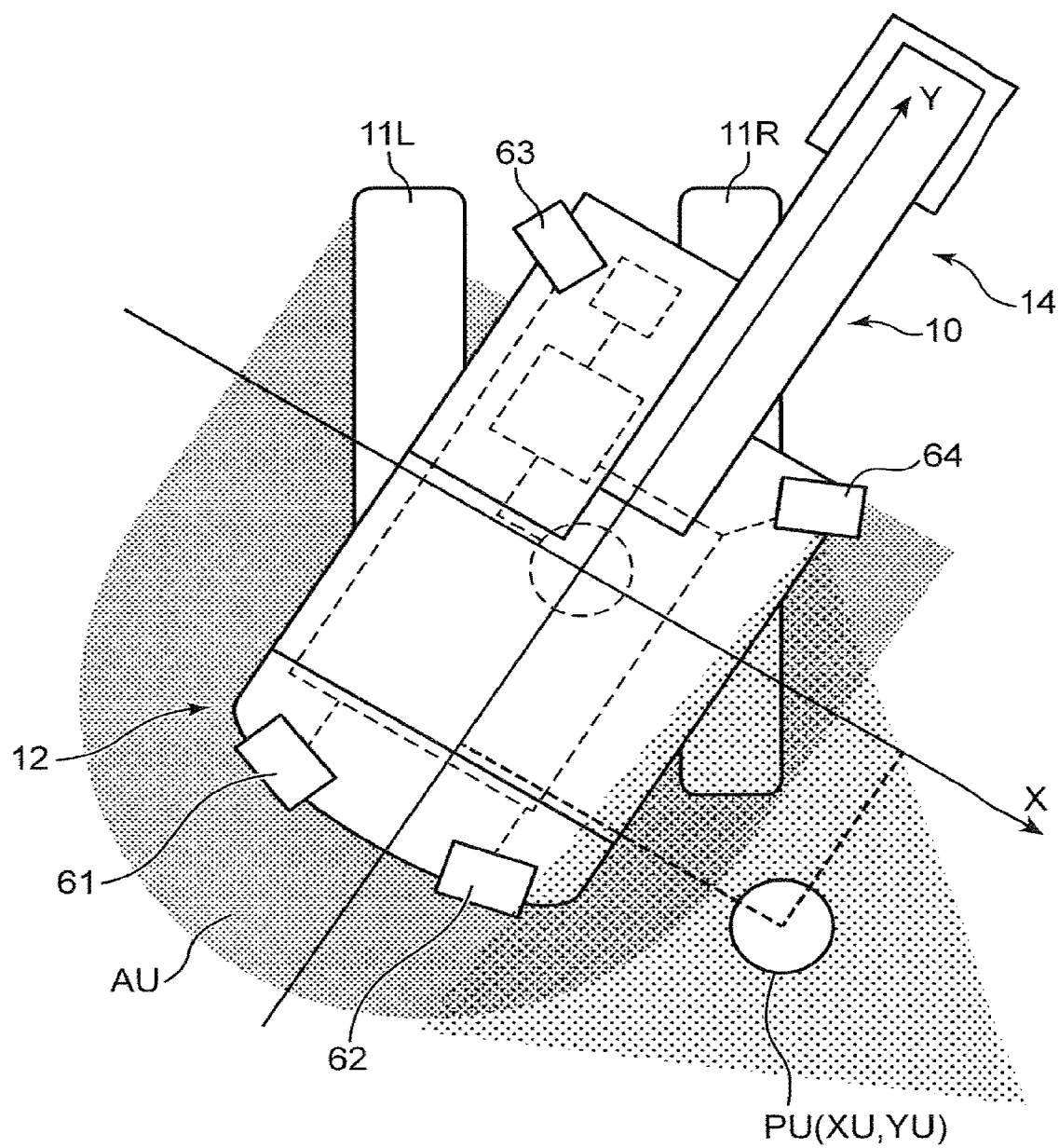
FIG. 5 is a plan view showing an upper-side judgment area that is set in the first embodiment.

The upper-side coordinate position calculation section 71 calculates an upper-side coordinate position PU of an obstacle detected by at least one of the obstacle sensors 61 to 64. The upper-side coordinate position PU is, for example, as shown in FIG. 5, the position of the obstacle specified in an upper-side coordinate system which is a coordinate system using the upper revolving body 12 as a reference.

Figure 6:
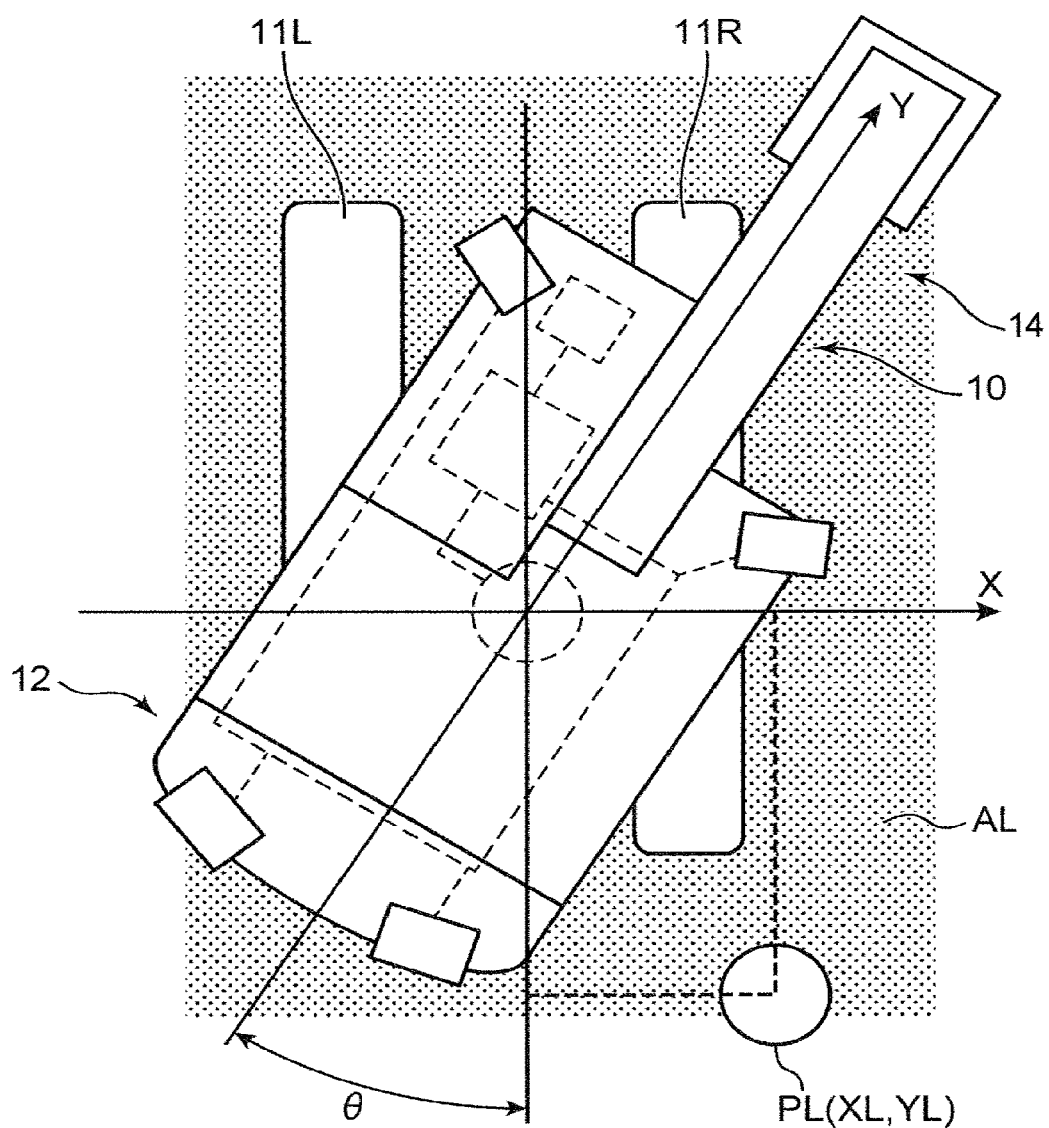
FIG. 6 is a plan view showing a lower-side judgment area that is set in the first embodiment.

The lower-side judgment area setting section 72 stores a judgment area that is preset around the lower traveling body 10 as a reference, and puts the area into the lower-side approach judgment section 74 as a lower-side judgment area AL, for example, as shown in FIG. 6. The lower-side judgment area AL is an area used for judging the approach of an obstacle to the lower traveling body 10. The lower-side judgment area setting section 72 may set the judgment area that is stored in advance as described above directly as the lower-side judgment area AL, or may set an area obtained by appropriately changing the judgment area, in accordance with the existence or absence of a member (e.g., a dozer) optionally mounted on the lower traveling body 10 or in response to a change operation applied by an operator, as the final lower-side judgment area AL. In either case, the position of the lower-side judgment area AL is specified by coordinates in a lower-side coordinate system which is a coordinate system using the lower traveling body 10 as a reference as shown in FIG. 6.

The coordinate transformation section 73 is configured to transform the upper-side coordinate position PU, which is one position of the upper-side coordinate position PU and the position of the lower-side judgment area AL, into the lower-side coordinate position PL that is the position in the coordinate system for specifying the position of the lower-side judgment area AL that is the other position, namely, the lower-side coordinate system, based on the revolving angle θ detected by the revolving angle sensor 66. Through this coordinate transformation, the coordinate transformation section 73 unifies the coordinate system for specifying the position of the obstacle and the coordinate system for specifying the position of the lower-side judgment area into the lower-side coordinate system.

When the traveling command operation is applied to the traveling drive device 30 by an operator in the cab 18, specifically, when the traveling pilot pressure detected by the traveling pilot pressure sensor 36 reaches a fixed value or above, the lower-side approach judgment section 74 judges whether or not the lower-side coordinate position PL, which is the position of the obstacle that has been coordinate-transformed by the coordinate transformation section 73, is a position within the lower-side judgment area AL, that is, whether or not the lower-side coordinate position PL is included in the lower-side judgment area AL, thereby judging whether or not the obstacle exists within the lower-side judgment area AL. In summary, it is judged whether or not the obstacle is close to the lower traveling body 10 enough to cause the necessity for restricting the traveling motion of the lower traveling body 10.

The upper-side judgment area setting section 75 stores the judgment area that preset around the upper revolving body 12 as a reference, and puts this area into the upper-side approach judgment section 76 as the upper-side judgment area AU, for example, as shown in FIG. 5. The upper-side judgment area AU is an area used to judge the approach of the obstacle to the upper revolving body 12. The upper-side judgment area setting section 75 may set the judgment area stored in advance as described above directly as the upper-side judgment area AU, or may set, as the final upper-side judgment area, an area obtained by appropriately changing the judgment area in response to a changing operation applied by an operator or in accordance with the type of the attachment located at the distal end of the working device 14 (for example, the bucket 24 or an optional device mounted in place thereof). In either case, as shown in FIG. 5, the position of the upper-side judgment area AU is specified by coordinates in the upper-side coordinate system which is a coordinate system using the upper revolving body 12 as a reference.

The upper-side approach judgment section 76 judges whether or not the upper-side coordinate position PU calculated by the upper-side coordinate position calculation section 71 is a position within the upper-side judgment area AU, that is, whether or not the upper-side coordinate position PU is included in the upper-side judgment area AU, thereby judging whether or not the obstacle exists within the upper-side judgment area AU. In summary, it is judged whether or not the obstacle is close to the upper revolving body 12 enough to cause the necessity for restricting the traveling motion of the lower traveling body 10.

When the revolving command operation is applied to the revolving drive device 32 by the operator in the cab 18, specifically, when the revolving pilot pressure detected by the revolving pilot pressure sensor 38 reaches a fixed value or above, the revolving direction approach judgment section 77 judges whether or not the upper-side coordinate position PU calculated by the upper-side coordinate position calculation section 71 is a position within the revolving direction judgment area that is preset around the upper revolving body 12 in consideration of the revolution of the upper revolving body 12, i.e., whether or not the obstacle is close to the upper revolving body 12 enough to cause the necessity for restricting the revolving motion of the upper revolving body 12. The revolving direction approach judgment section 77 is not an essential element constituting the present invention. Accordingly, the present invention includes also an aspect that does not include the revolving direction approach judgment section 77.

The safety operation command section 78 generates a safety operation command corresponding to the judgment result provided by each of the judgment sections 74, 76, and 77, and outputs the safety operation command. Specific examples are as follows.

(A) When the lower-side approach judgment section 74 judges that the louver-side coordinate position PL is a position within the lower-side judgment area AL, or when the upper-side approach judgment section 76 judges that the upper-side coordinate position PU is a position within the upper-side judgment area AU, the safety operation command section 78 inputs a traveling motion restriction signal to an appropriate element of the traveling drive device 30. For example, in the case where the traveling drive device 30 is a hydraulic circuit as described above, the appropriate element is a traveling control solenoid valve. The safety operation command section 78 thereby forcibly restricts the traveling speed of the lower traveling body 10 in the traveling direction in which the lower traveling body 10 approaches the obstacle, regardless of the traveling command operation applied by the operator. The restriction includes also a forced stop of the traveling of the lower traveling body 10.

(B) When the revolving direction approach judgment section 77 judges that the upper-side coordinate position PU is a position within the revolving direction judgment area, the safety operation command section 78 inputs a revolving motion restriction signal to an appropriate element of the revolving drive device 32. For example, in the case where the revolving drive device 32 is a hydraulic circuit as described above, the appropriate element is a revolving control solenoid valve. The safety operation command section 78 thereby forcibly restricts the revolving speed of the upper revolving body 12 in the revolving direction in which the upper revolving body 12 approaches the obstacle, regardless of the revolving command operation applied by the operator. The restriction includes also a forced stop of the revolution of the upper revolving body 12.

(C) In any case of (A) and (B), the safety operation command section 78 inputs an alarm command signal to the alarm device 40 to make the alarm device 40 perform an appropriate alarm operation.

Next will be described a specific safety control operation performed by the controller 70 with respect to the restriction of the traveling of the lower traveling body 10, with reference to the flowchart of FIG. 4.

Figure 4:
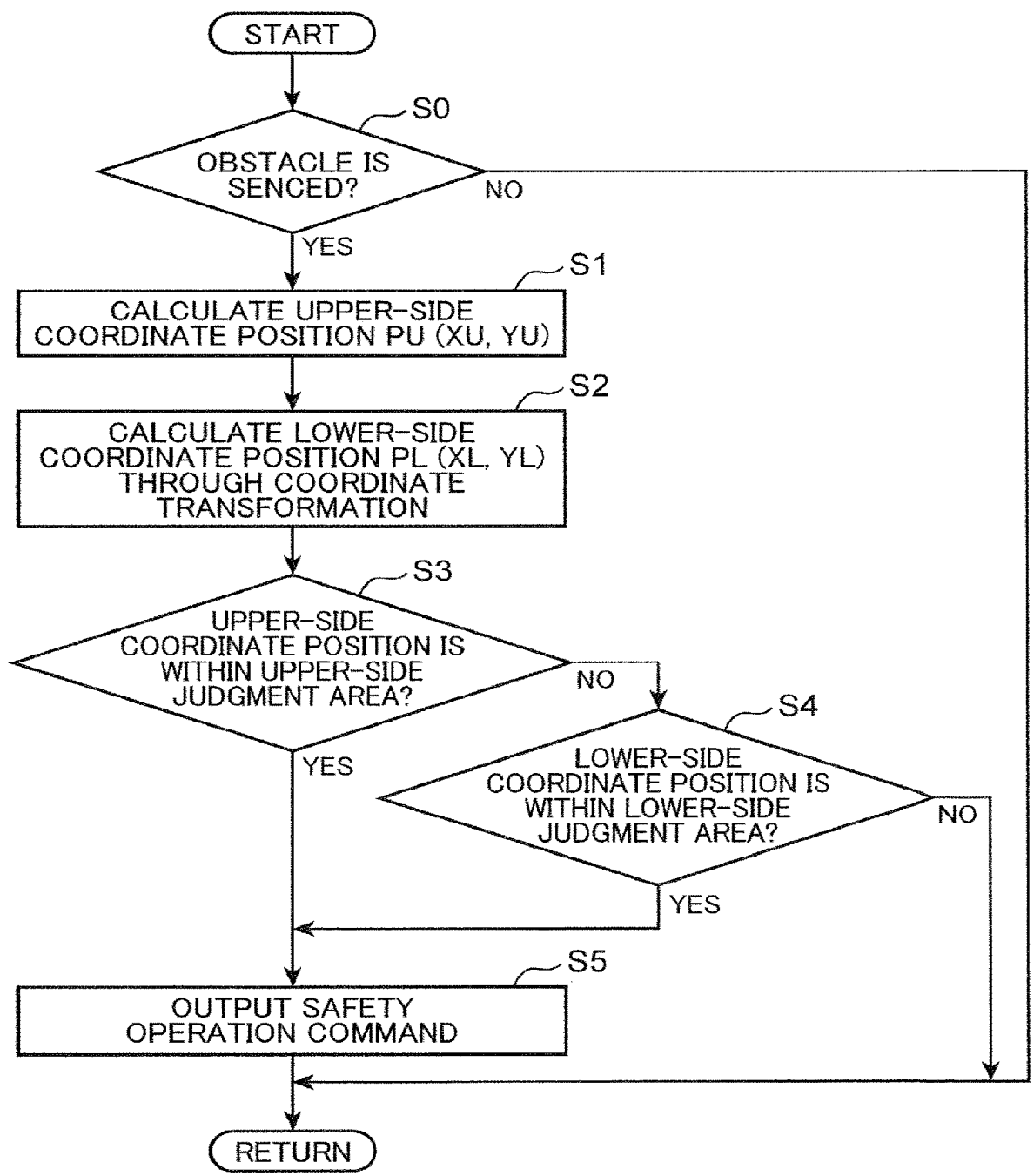
FIG. 4 is a flowchart showing an arithmetic control operation performed by a controller of the safety apparatus according to the first embodiment.

The controller 70 performs the following safety control operations when at least one of the obstacle sensors 61 to 64 detects an obstacle around the hydraulic excavator (YES in step S0 of FIG. 4).

(1) Calculation of the Upper-Side Coordinate Position PU (Step S1)

The upper-side coordinate position calculation section 71 of the controller 70 calculates, based on the relative position of the obstacle to the mounting position (the setting portion corresponding to the obstacle sensor) of the obstacle sensor that detects the obstacle among the obstacle sensors 61 to 64 in the upper revolving body 12, the upper-side coordinate position PU as shown in FIG. 5, i.e., the position of the obstacle specified in the upper-side coordinate system using the upper revolving body 12 as a reference. More specifically, the upper-side coordinate position calculation section 71 calculates an X-coordinate XU and a Y-coordinate YU of the upper-side coordinate position PU in the upper-side coordinate system. When a plurality of obstacle sensors included in the obstacle sensors 61 to 64 detect the obstacle, the upper-side coordinate position calculation section 71, in principle, employs the closest mounting position of the obstacle sensor to the obstacle.

(2) Calculation of the Lower-Side Coordinate Position PL (Step S2).

Next, the coordinate transformation section 73 of the controller 70 transforms the coordinates (XU, YU) of the upper-side coordinate position PU into coordinates (XL, YL) in the lower-side coordinate system using the lower traveling body 10 as a reference as shown in FIG. 6, thereby calculating the lower-side coordinate position PI, (XL, YL) which is the position of the obstacle specified in the lower-side coordinate system. This coordinate transformation can be performed by use of the transformation matrix shown in the following equation (1), based on the revolving angle θ detected by the revolving angle sensor 66.

$$\begin{pmatrix} XL \\ YL \end{pmatrix} = \begin{pmatrix} \cos\theta & -\sin\theta \\ \sin\theta & \cos\theta \end{pmatrix} \begin{pmatrix} XU \\ YU \end{pmatrix} \qquad \text{[Formula 1]}$$

(3) Judgment on the Approach of the Obstacle to the Upper Revolving Body 12 (Step S3)

The upper-side approach judgment section 76 of the controller 70 judges whether or not the upper-side coordinate position PU (XU, YU) calculated by the upper-side coordinate position calculation section 71 is a position within the upper-side judgment area AU. The upper-side judgment area AU is an area that is set by the upper-side judgment area setting section 75, for example, the area shown in FIG. 5. Since both the upper-side coordinate position PU and the upper-side judgment area AU are set in the upper-side coordinate system using the upper revolving body 12 as a reference, the upper-side approach judgment section 76 can accurately judge whether or not the obstacle exists within the upper-side judgment area, that is, whether or not the obstacle is actually close to the upper revolving body 12.

FIG. 5 shows an example of a relative positional relationship between the upper-side coordinate position PU (XL, YL) of an obstacle detected by the obstacle sensor 64 included in the plurality of obstacle sensors 61 to 64 and the upper-side judgment area AU. The upper-side judgment area AU shown here has an outer shape approximate to the contour of the upper revolving body 12 in a plan view. However, the specific shape of the upper-side judgment area according to the present invention is not limited. Besides, the present invention encompasses also a mode in which the judgment by use of the upper-side judgment area is not performed.

(4) Judgment on the Approach of the Obstacle to the Lower Traveling Body 10 (Step S4)

When the upper-side coordinate position PU is not within the upper-side judgment area AU (NO in step S3), for example, when the upper-side coordinate position PU is outside the upper-side judgment area AU as shown in FIG. 5, the lower-side approach judgment section 74 of the controller 70 judges whether or not the lower-side coordinate position PL (XL, YL) is a position within the lower-side judgment area AL that is set by the lower-side judgment area setting section 72. The lower-side coordinate position PL is the position of the obstacle, having been coordinate-transformed by the coordinate transformation section 73, that is, a position in the lower-side coordinate system using the lower traveling body 10 as a reference. Since both the lower-side coordinate position PL and the lower-side judgment area AL are thus specified in the lower-side coordinate system using the lower traveling body 10 as a reference, the lower-side approach judgment section 74 can accurately judge whether or not the obstacle exists within the lower-side judgment area AL in the lower-side coordinate system, that is, whether or not the obstacle is actually close to the lower traveling body 10.

The outer shape of the lower-side judgment area AL illustrated in FIG. 6 is set to a rectangular shape along the outer shape of the crawlers 11L and 11R of the upper revolving body 12 in a plan view. However, the specific shape of the upper-side judgment area according to the present invention is not limited.

(5) Output of Safety Operation Command (Step S5)

When the upper-side approach judgment section 76 judges that the upper-side coordinate position PU is a position within the upper-side judgment area AU (YES in step S3) or when the lower-side approach judgment section 74 judges that the lower-side coordinate position PL is a position within the lower-side judgment area AL (YES in step S3), the safety operation command section 78 of the controller 70 inputs a traveling motion restriction signal to an appropriate element (e.g., the traveling control solenoid valve) of the traveling drive device 30 to perform restriction of the traveling speed (including forced stop) of the lower traveling body 10 in a direction in which the lower traveling body 10 approaches the obstacle, the direction being one of the traveling directions (forward direction and backward direction), and inputs an alarm command signal to the alarm device 40 to make an alarm operation be performed. Each of the traveling motion restriction signal and the alarm command signal may be output only when the actual traveling direction is a direction of approaching an obstacle, or may be output regardless of the actual traveling direction. In either case, the traveling motion of the lower traveling body 10 in a direction in which the lower traveling body 10 goes away from the obstacle is not restricted.

Although not shown in FIG. 4, when the revolving direction approach judgment section 77 judges that the upper-side coordinate position PU is a position within the revolving direction judgment area, the safety operation command section 78 according to this embodiment performs restriction of the revolving speed of the upper revolving body 12 (including forced stop) by input of a revolving motion restriction signal to an appropriate element (for example, the revolving control electromagnetic valve) of the revolving drive device 32, and inputs an alarm command signal to the alarm device 40 to make an alarm operation be performed. Each of the revolving motion restriction signal and the alarm command signal may also be output either only when the actual traveling direction is a direction of approaching the obstacle or regardless of the actual traveling direction.

The coordinate transformation section 73 according to the safety apparatus described above unifies the coordinate system for specifying the position of the obstacle and the coordinate system for specifying the position of the lower-side judgment area AL that is set around the lower traveling body 10 into the lower-side coordinate system through the coordinate transformation of the position of the obstacle, thereby allowing it to be accurately judged whether or not the obstacle exists within the lower-side judgment area AL in the unified coordinate system. This makes it possible to establish accurate safety control for preventing the lower traveling body 10 from contact with the obstacle due to the traveling of the lower traveling body 10, regardless of the posture of the upper revolving body 12 relative to the lower traveling body 10, that is, regardless of the revolving angle θ of the upper revolving body 12, even though the obstacle sensors 61 to 64 are disposed in the upper revolving body 12 (rather than the lower traveling body 10).

For example, when the upper-side coordinate position PU is a position as shown in FIG. 5, the judgment on the basis of only the comparison between the upper-side coordinate position PU and the upper-side judgment area AU using the upper revolving body 12 as a reference involves a possibility of failing to execute the safety operation in spite that the obstacle is actually located on the rear side of the lower traveling body 10 to exist in the traveling path of the lower traveling body 10. In contrast, the judgment on the basis of the comparison between the lower-side coordinate position PL having been coordinate-transformed into the lower-side coordinate system and the lower-side judgment area AL as described above makes it possible to reliably restrict the traveling motion of the lower traveling body 10 even when the obstacle is in the position shown in FIGS. 5 and 6.

There will be described a second embodiment of the present invention with reference to FIGS. 7 to 10.

Figure 7:
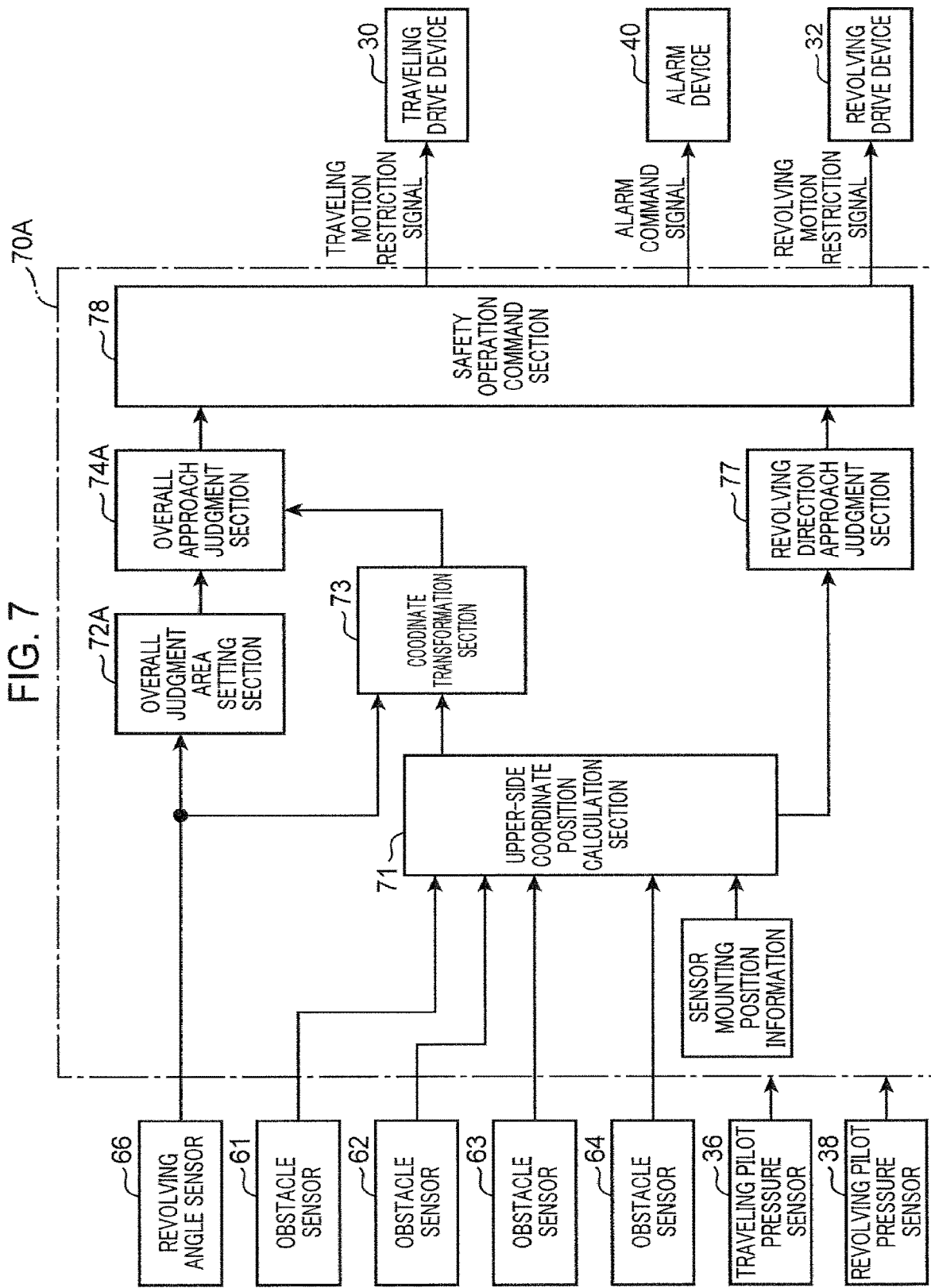
FIG. 7 is a block diagram showing a safety apparatus according to the second embodiment of the present invention.

The safety apparatus according to the second embodiment differs from the safety apparatus according to the first embodiment only in the following points. The safety apparatus according to the second embodiment includes a controller 70A as shown in FIG. 7 similar to the controller 70 according to the first embodiment, but the controller 70A includes an overall judgment area setting section 72A in place of the lower-side judgment area setting section 72 according to the first embodiment, and includes an overall approach judgment section 74A in place of the lower-side approach judgment section 74 according to the first embodiment. The overall judgment area setting section 72A functions as the lower-side judgment area setting section according to the present invention, and the overall approach judgment section 74A functions as the lower-side approach judgment section according to the present invention. Besides, the controller 70A according to the second embodiment does not include either the upper-side judgment area setting section 75 or the upper-side approach judgment section 76 according to the first embodiment.

Figure 10:
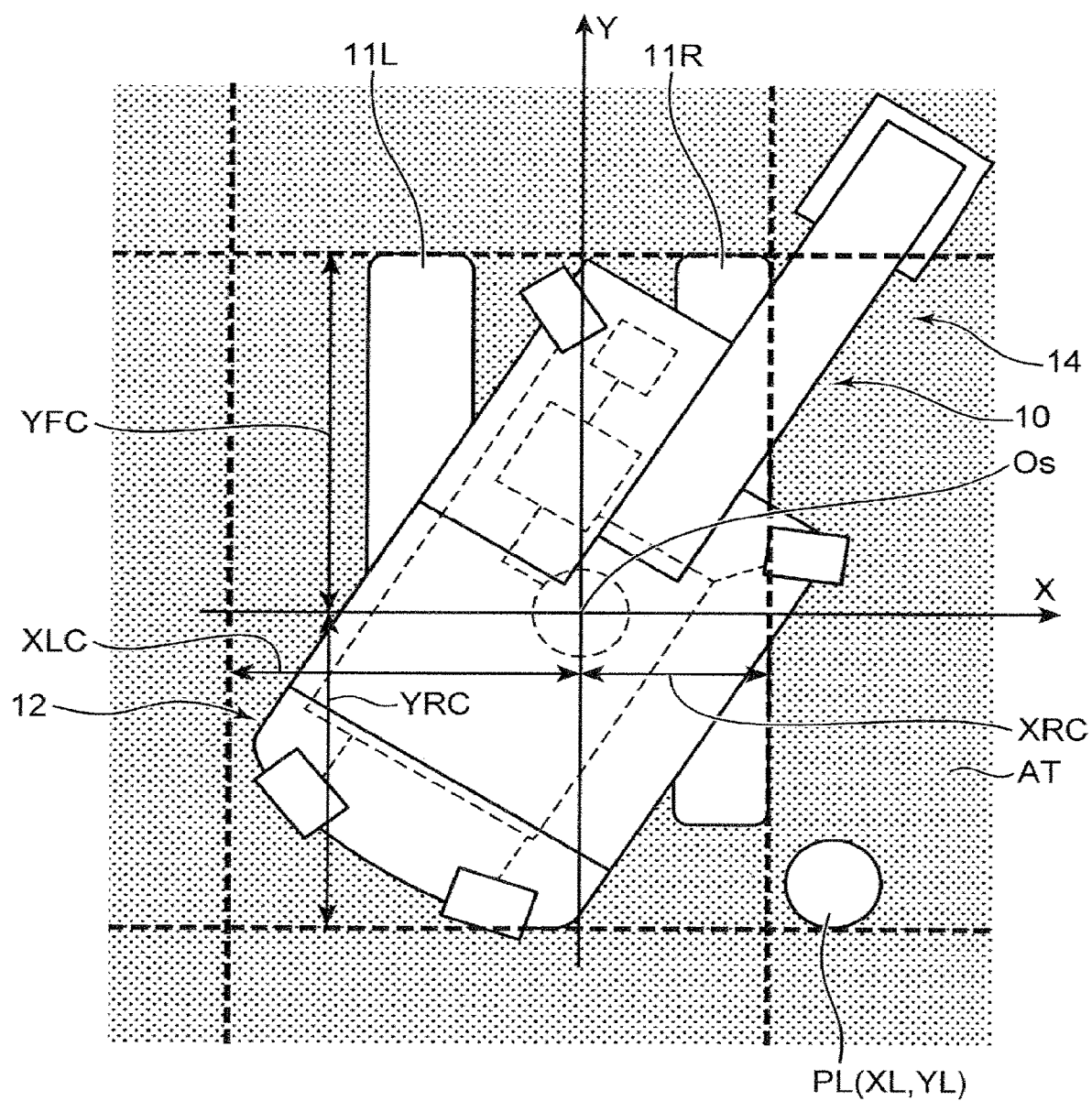
FIG. 10 is a plan view showing an overall judgment area that is set in the second embodiment.

The overall judgment area setting section 72A sets an overall judgment area AT, for example, as shown in FIG. 10, as a lower-side judgment area according to the present invention. The overall judgment area setting section 72A sets the overall judgment area AT around both the lower traveling body 10 and the upper revolving body 12 based on the revolving angle θ detected by the revolving angle sensor 66. The upper-side approach judgment section 76 judges whether or not the lower-side coordinate position PL calculated by the upper-side coordinate position calculation section 71 and the coordinate transformation section 73 of the controller 70 is a position within the overall judgment area AT, that is, whether or not the lower-side coordinate position PL is included in the overall judgment area AT. The lower-side coordinate position PL is a position of an obstacle in the lower-side coordinate system using the lower traveling body 10 as a reference.

Figure 8:
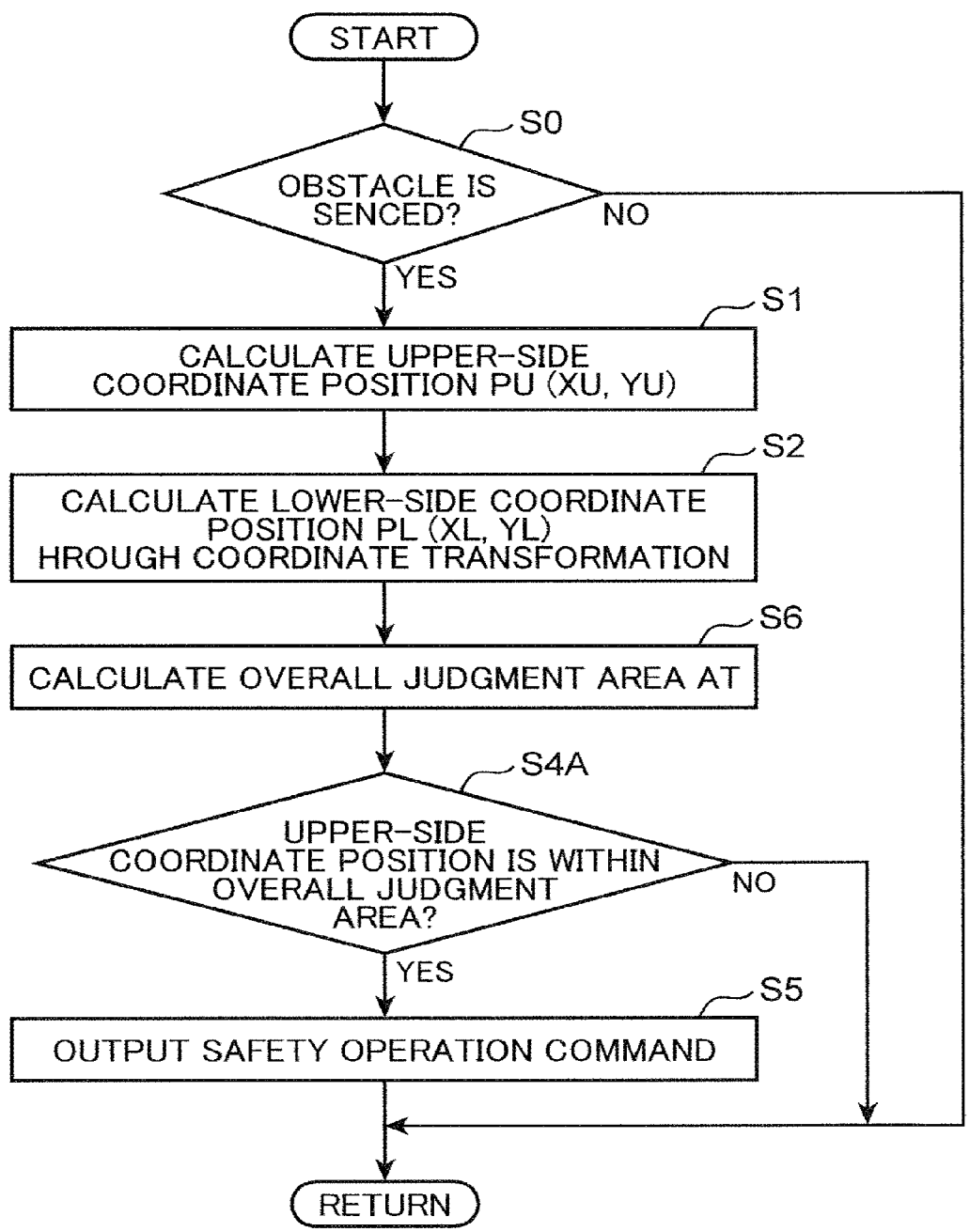
FIG. 8 is a flowchart showing an arithmetic control operation performed by a controller of the safety apparatus according to the second embodiment.

FIG. 8 shows a specific arithmetic control operation performed by the controller 70A. When any of the obstacle sensors 61 to 64 detects an obstacle (YES in Step S0), the upper-side coordinate position calculation section 71 of the controller 70A, similarly to the first embodiment, calculates the upper-side coordinate position PU (XU, YU) which is the position of the obstacle in the upper-side coordinate system (Step S1) furthermore, the coordinate transformation section 73 transforms the upper-side coordinate position PU into the lower-side coordinate system to calculate the lower-side coordinate position PL (XL, YL) (Step S2). On the other hand, the overall judgment area setting section 72A of the controller 70A calculates the overall judgment area AT in the lower-side coordinate system, based on the revolving angle θ (step S6).

Figure 9:
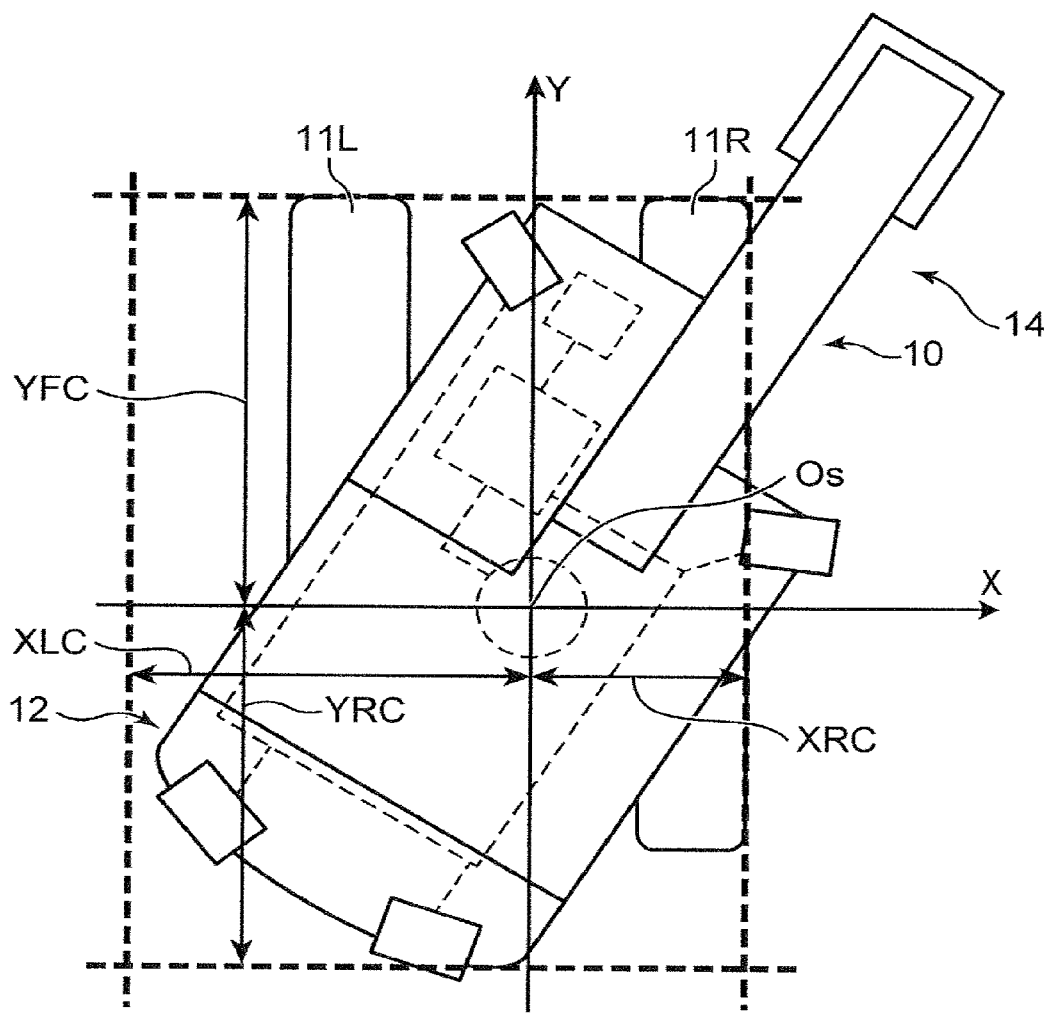
FIG. 9 is a plan view showing respective distances calculated for setting the overall judgment area in the second embodiment.

The overall judgment area setting section 72A according to the second embodiment calculates the overall judgment area AT in the following procedure. The overall judgment area setting section 72A, first, performs an operation on the entire outer shape of the hydraulic excavator including both the lower traveling body 10 and the upper revolving body 12 based on information given in advance about the shape of the lower traveling body 10 and the upper revolving body 12, and the revolving angle θ. Specifically, the overall judgment area setting section 72A calculates a left vehicle width XLC, a right vehicle width XRC, a front vehicle length YFC and a rear vehicle length YRC as shown in FIG. 9. Each of them is a length calculated in the lower-side coordinate system using the lower traveling body 10 as a reference. Specifically, when the direction perpendicular to the traveling direction of the lower traveling body 10 is called a width direction, the left vehicle width XLC is the distance in the width direction from the revolving center Os of the upper revolving body 12 to the left end of the entire hydraulic excavator (the left rear portion of the upper revolving body 12 in the posture shown in FIG. 9), and the right vehicle width XRC is the distance in the width direction from the revolving center Os to the right end of the entire hydraulic excavator (the outer end of the right crawler 11R in the posture shown in FIG. 9). Besides, the front vehicle length YFC is the distance in the traveling direction from the revolving center Os to the front end of the entire hydraulic excavator (respective front ends of both the crawlers 11L and 11R in the posture shown in FIG. 9), and the rear vehicle length YRC is the distance in the traveling direction from the revolving center Os to the rear end of the entire hydraulic excavator (the right rear portion of the upper revolving body 12 in the posture shown in FIG. 9). In the posture shown in FIG. 9, the working device 14 sufficiently raised is not taken into consideration for the calculation of the right vehicle width XRC and the front vehicle length YFC.

Next, the overall judgment area setting section 72A, based on the respective lengths (distance) XLC, XRC, YFC, YRC calculated as to the outer shape of the hydraulic excavator, sets an area one size larger than the outer shape of the entire hydraulic excavator in a plan view as the overall judgment area AT. The overall judgment area AT has, for example, a rectangular shape larger than the outer shape in four directions of front, rear, left, and right. Specifically, respective distances from the revolving center Os to the left end, the right end, the front end and rear end of the overall judgment area AT, namely, XLA, XRA, YFA and YRA, are expressed by the following equation.

$$XLA = XLC + \Delta XL$$

$$XRA = XRC + \Delta XR$$

$$YFA = YFC + \Delta YF$$

$$YRA = YRC + \Delta YR$$

Wherein, $\Delta XL$, $\Delta XR$, $\Delta YF$, and $\Delta YR$ are predetermined constants for specifying respective protrusion dimensions of the areas from the outer shape of the hydraulic excavator, being allowed to be equal to or different from each other. The larger these constants are, the larger the outer shape of the overall judgment area AT is, that is, the overall judgment area AT is set with more emphasis on safety.

The overall approach judgment section 74A of the controller 70A executes step S4A shown in FIG. 8 instead of step S4 according to the first embodiment. Specifically, it is judged whether or not the lower-side coordinate position PL (XL, YL) is within the overall judgment area AT. The overall judgment area AT, being an area that is set in consideration of the entire hydraulic excavator including the upper revolving body 12 as well as the lower traveling body 10, eliminates the necessity for the judgment based on the upper-side coordinate position PU and the upper-side judgment area AU as shown in FIG. 4 (step S3). This enables the safety operation command section 78 of the controller 70A to perform accurate safety control for the traveling motion of the lower traveling body 10 by output of a safety operation command based on only the judgment whether or not the lower-side coordinate position PL (XL, YL) is a position within the overall judgment area AT (Step S5).

Next will be described a third embodiment with reference to FIGS. 11 to 15.

Figure 11:
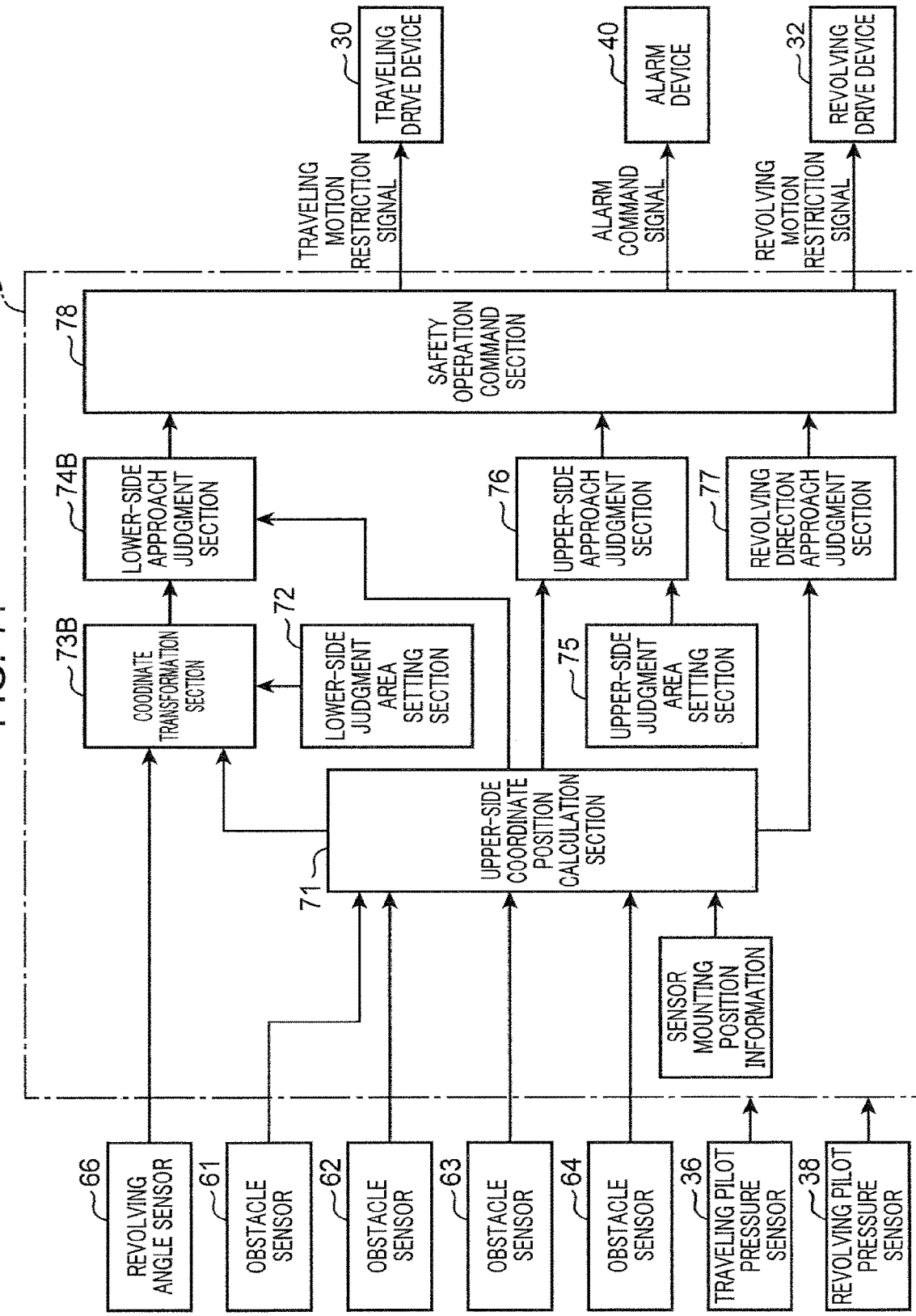
FIG. 11 is a block diagram showing a safety apparatus according to a third embodiment of the present invention.

The safety apparatus according to the third embodiment differs from the safety apparatus according to the first embodiment only in the following points. The safety apparatus according to the third embodiment includes a controller 70B as shown in FIG. 11, which is the same as the controller 70 according to the first embodiment, but the controller 70B includes a coordinate transformation section 73B shown in FIG. 11 in place of the coordinate transformation section 73 according to the first embodiment, and includes a lower-side approach judgment section 74B shown in FIG. 11 in place of the lower-side approach judgment section 74 according to the first embodiment.

Figure 12:
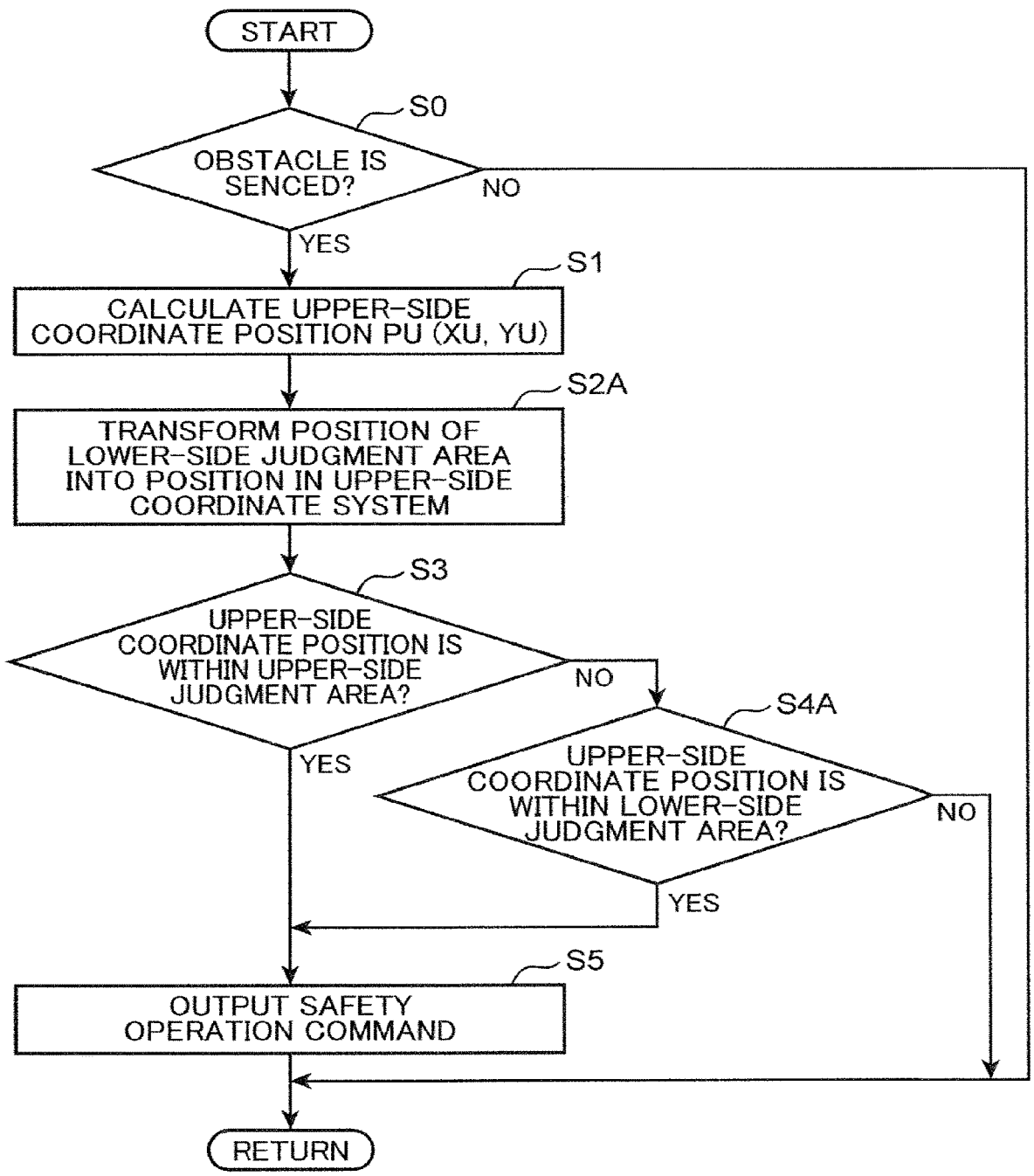
FIG. 12 is a flowchart showing an arithmetic control operation performed by a controller of the safety apparatus according to the third embodiment.

The coordinate transformation section 73 according to the first embodiment transforms the upper-side coordinate position PU (XU, YU) which is the position of the obstacle in the upper-side coordinate system, out of the upper-side coordinate position PU and the lower-side judgment area AL in the lower-side coordinate system, into the position PL (XL, YL) in the lower-side coordinate system which is the coordinate system of the lower-side judgment area AL, thereby unifying the coordinate system for specifying the upper-side coordinate position PU and the coordinate system for specifying the lower-side judgment area AL into the lower-side coordinate system (step S2 in FIG. 4), whereas the coordinate transformation section 73B according to the third embodiment transforms the position of the lower-side judgment area AL into the position in the upper-side coordinate system in step S2A shown in the flowchart of FIG. 12, thereby unifying the coordinate system for specifying the upper-side coordinate position PU and the lower-side judgment area AL into the upper-side coordinate system. The lower-side approach judgment section 74B executes step S4A of FIG. 12 instead of step S4 of FIG. 4. Specifically, in the coordinate system unified as described above, that is, the upper-side coordinate system, it is judged whether or not the upper-side coordinate position PU (XU, YU) is a position within the lower-side judgment area AL that has been transformed to the upper-side coordinate system.

Figure 13:
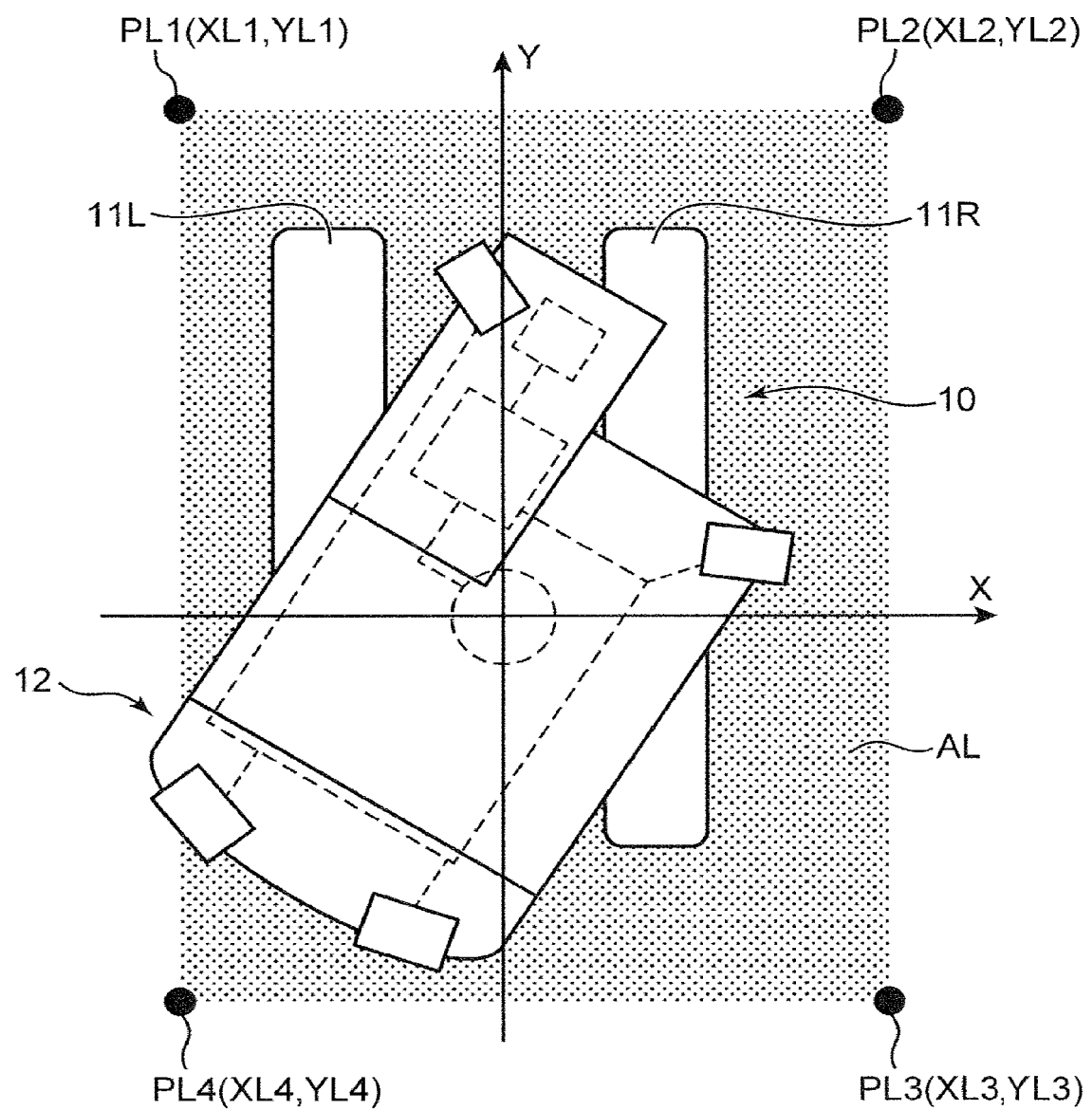
FIG. 13 is a plan view showing a lower-side judgment area that is set using the lower traveling body as a reference in the third embodiment.
Figure 14:
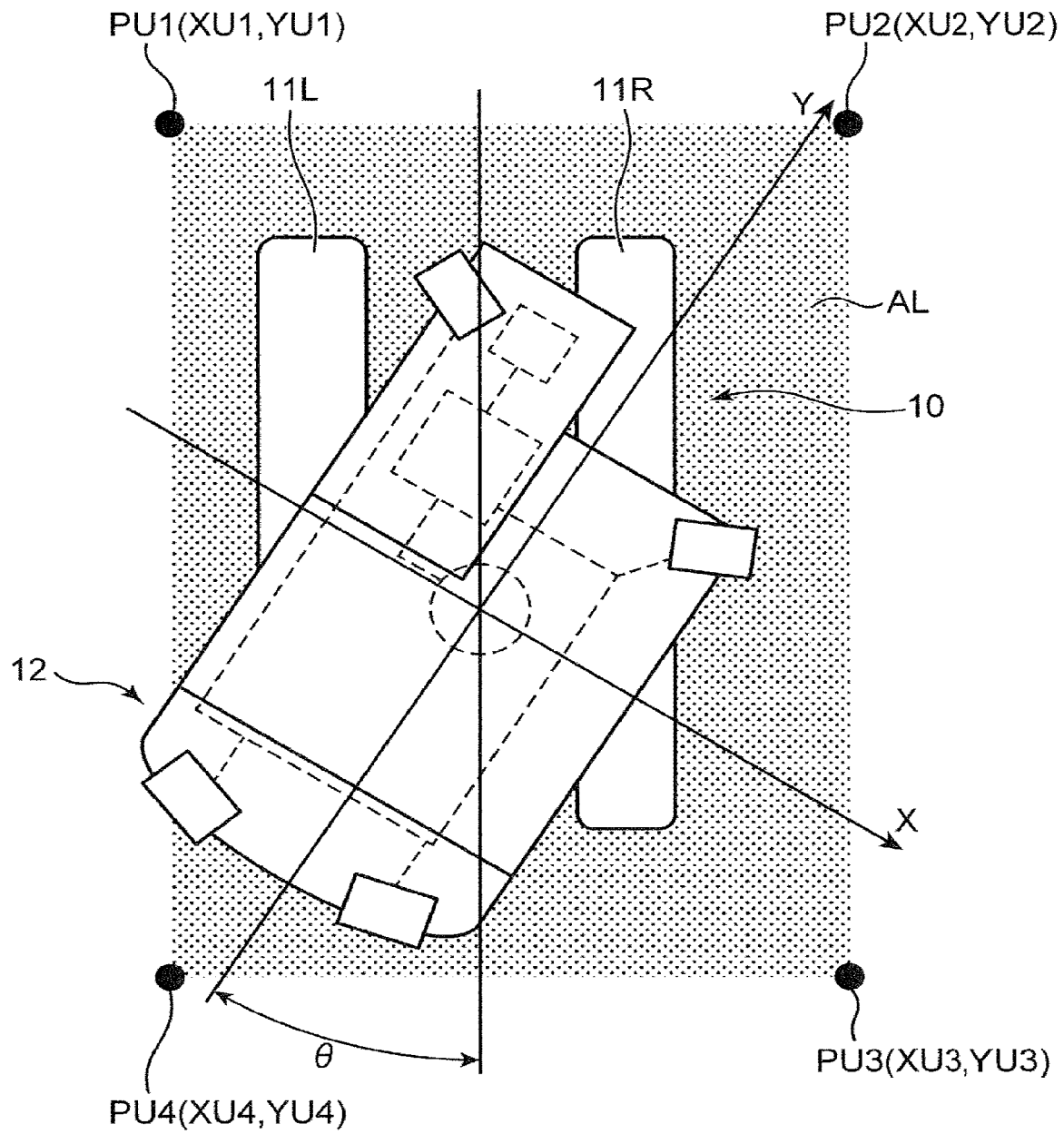
FIG. 14 is a plan view showing a lower-side judgment area in the third embodiment, the position of which has been coordinate-transformed into the position in the upper-side coordinate system using the upper revolving body as a reference.

In the case where the lower-side judgment area AL is a rectangular area, for example, as shown in FIG. 13 in a plan view, it is preferable that the coordinate transformation section 73B transforms respective coordinates (XL1,YL1), (XL2,YL2), (XL3,YL3), and (XL4,YL4) of the positions PL1, PL2, PL3, PL4 of the four vertices of the lower-side judgment area AL in the lower-side coordinate system into the coordinates (XU1,YU1), (XU2,YU2), (XU3,YU3) and (XU4,YU4) in the upper-side coordinate system, respectively. This allows the lower-side judgment area AL having respective vertices at four positions PU1, PU2, PU3, PU4 corresponding to the respective coordinates, that is, set in the upper-side coordinate system, to be obtained. Even when the lower-side judgment area AL has a shape other than a rectangle, it is possible to shift the lower-side judgment area AL from the lower-side coordinate system to the upper-side coordinate system by selecting a representative point of the lower-side judgment area AL and performing coordinate transformation on the representative point.

On the other hand, also in the controller 70B according to the third embodiment, the upper-side approach judgment section 76 judges whether or not the upper-side coordinate position PU is a position within the upper-side judgment area AU, in step S3. The safety operation command section 78 of the controller 70B outputs a safety operation command (step S5) in either the case where the upper-side approach judgment section 76 judges that the upper-side coordinate position PU (XU, YU) is a position within the upper-side judgment area AU (YES in step S3) or the case where the lower-side approach judgment section 74B judges that the upper-side coordinate position PU (XU, YU) is a position within the lower-side judgment area AL.

Figure 15:
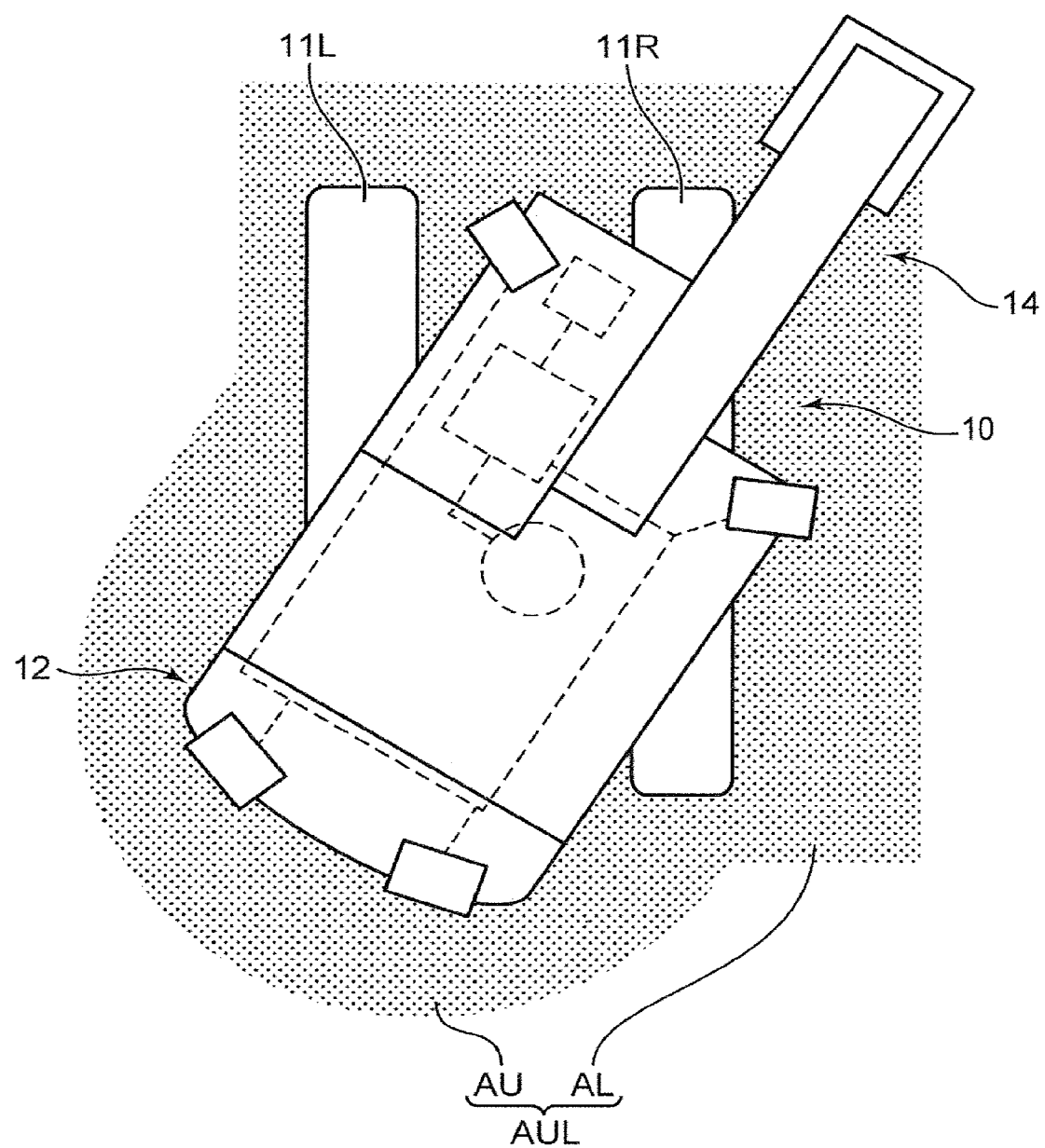
FIG. 15 is a plan view showing a combined area in which the lower-side judgment area and the upper-side judgment area in the upper-side coordinate system are combined in the third embodiment.

Thus, the lower-side approach judgment section 74B and the upper-side approach judgment section 76 of the controller 70B cooperate with each other to judge whether or not the upper-side coordinate position PU is included in the combined area ALU as shown in FIG. 15, which is an area where the lower-side judgment area AL and the upper-side judgment area AU are combined with each other.

The safety apparatus according to the present invention, thus, encompasses an embodiment including, as the lower-side approach judgment section, a judgment section that judges whether or not the upper-side coordinate position PU is included in an area obtained by adding the lower-side judgment area that has been coordinate-transformed and the upper-side judgment area to each other, as in the case of the combined area ALU, in place of the lower-side approach judgment section 74B and the upper-side approach judgment section 76.

The present invention is not limited to the above-described embodiments. The present invention encompasses, for example, the following modes.

(A) Judgment Area

The specific shape of the lower-side judgment area according to the present invention is not limited. For example, if the lower traveling body 10 shown in FIG. 5 includes a portion projecting beyond the left and right crawlers 11L and 11R longitudinally or laterally in a plan view, the shape of the lower-side judgment area may be set to not a rectangular shape but such an irregular shape as to include the projecting portion.

The upper-side judgment area can also be freely set in accordance with the shape of the specific upper revolving body or the like. Besides, the upper-side judgment area is optional. In the case of low necessity for considering the upper revolving body with respect to the safety during traveling, for example, in a small revolving type excavator, it is also allowed to set only a lower-side judgment area.

In the case where the judgment area is an area for decelerating the lower traveling body, an area may be additionally set inside the judgment area for forcibly stopping the lower traveling body. In contrast, in the case where the judgment area is an area for forcibly stopping the lower traveling body, a deceleration area may be additionally set outside the judgment area.

Besides, respective height positions of the upper end and the lower end of each of the judgment areas can be freely set.

(B) Safety Operation Command

The safety operation command section according to the present invention may be output, as the safety operation command, only one of the traveling motion restriction signal and the alarm command signal. Besides, it is also possible to individually set a judgment area for judging the necessity for the output of the traveling motion restriction signal and a judgment area for judging the necessity for the output of the alarm command signal. The safety operation command may be one other than the traveling motion restriction signal or the alarm command signal.

As described above, there is provided a safety apparatus installed on a revolving type work machine including a lower traveling body and an upper revolving body, being capable of performing an accurate safety control regardless of the posture of the upper revolving body while an obstacle sensor for detecting an obstacle is disposed on the upper revolving body.

Provided is a safety apparatus installed on a work machine including a lower traveling body capable of traveling on the ground and an upper revolving body mounted on the lower traveling body so as to be revolvable, the safety apparatus including: an obstacle sensor provided in a specific portion of the upper revolving body to detect an obstacle around the work machine; a revolving angle detector that detects a revolving angle of the upper revolving body to the lower traveling body; an upper-side coordinate position calculation section that calculates an upper-side coordinate position that is a position of the obstacle detected by the obstacle sensor, the position being a position in a coordinate system using the upper revolving body as a reference; a lower-side judgment area setting section that sets a lower-side judgment area for judging an approach of the obstacle at least in the periphery of the lower traveling body using the lower traveling body as a reference; a coordinate transformation section that transforms one position of the upper-side coordinate position and a position of the lower-side judgment area into a position in the coordinate system to which the other position of the upper-side coordinate position and the position of the lower-side judgment area belongs, based on the revolving angle detected by the revolving angle detector, to thereby unify a coordinate system for specifying the position of the obstacle and a coordinate system for specifying the position of the lower-side judgment area; a lower-side approach judgment section that judges whether or not the obstacle exists within the lower-side judgment area in the coordinate system unified by the coordinate transformation section; and a safety operation command section that outputs a safety operation command for making the work machine perform a safety operation when the lower-side approach judgment section judges that the obstacle exists within the lower-side judgment area.

This safety apparatus, even though the obstacle sensor is disposed on the upper revolving body, allows a coordinate system for specifying two positions to be unified, the two positions being an upper-side coordinate position which is a position of the obstacle detected by the obstacle sensor using the upper revolving body as a reference and a position of a lower-side judgment area that is set around the lower traveling body using the lower traveling body as a reference, through a coordinate transformation of one of the two positions. This makes it possible to accurately judge whether or not the obstacle exists within the lower-side judgment area in the common coordinate system that is unified as described above, even though the obstacle sensor is disposed not in the lower traveling body but in the upper revolving body. This enables accurate safety control to be established for preventing the lower traveling body from contact with the obstacle due to the traveling of the lower traveling body, regardless of the posture of the upper traveling body, that is, the revolving angle to the lower traveling body.

Specific preferred aspects of the safety apparatus include, for example, a first aspect and a second aspect as follows.

In the first aspect, the coordinate transformation section is configured to transform the upper-side coordinate position into a lower-side coordinate position using the lower traveling body as a reference; the lower-side approach judgment section is configured to judge whether or not the lower-side coordinate position is a position within the lower-side judgment area; the safety operation command section is configured to output the safety operation command when the lower-side approach judgment section judges that the lower-side coordinate position is a position within the lower-side judgment area. In this first aspect, it can be accurately judged whether or not an obstacle exists within the lower-side judgment area in the unified coordinate system (the coordinate system using the lower traveling body as a reference) with a simple configuration only for coordinate-transforming the upper-side coordinate position, that is, the position of the obstacle using the upper revolving body as a reference, with no coordinate transformation of the position of the lower-side judgment area.

In the first aspect, it is more preferable that the safety apparatus further comprises: an upper-side judgment area setting section that sets an upper-side judgment area for judging an approach of the obstacle to the upper revolving body around the upper revolving body using the upper revolving body as a reference; and an upper-side approach judgment section that judges whether or not the upper-side coordinate position is a position within the upper-side judgment area, wherein the safety operation command section is configured to output the safety operation command also when the upper-side approach judgment section judges that the upper-side coordinate position is a position within the upper-side judgment area. This enables a safety control to be established for preventing the upper revolving body from contact with the obstacle due to the traveling motion of the lower traveling body.

Alternatively, in the first aspect, it is also preferable that: the lower-side judgment area setting section is an overall judgment area setting section that sets an overall judgment area, as the lower-side judgment area, around both the lower traveling body and the lower traveling body on the basis of the revolving angle detected by the revolving angle detector; the lower-side approach judgment section is an overall approach judgment section that judges whether or not the lower-side coordinate position is a position within the overall judgment area; the safety operation command section is configured to output the safety operation command when the overall approach judgment section judges that the lower-side coordinate position is a position within the overall judgment area. Such comparison of the lower-side coordinate position with the overall judgment area also enables a safety control to be established for preventing the obstacle from contact with both the lower traveling body and the upper revolving body.

In the second aspect, the coordinate transformation section is configured to transform the position of the lower-side judgment area into a position using the upper revolving body as a reference, based on the revolving angle detected by the revolving angle detector; the lower-side approach judgment section is configured to judge whether or not the upper-side coordinate position is a position within the lower-side judgment area that has been coordinate-transformed by the coordinate transformation section; and the safety operation command section is configured to output the safety operation command when the lower-side approach judgment section judges that the upper-side coordinate position is a position within the lower-side judgment area that has been coordinate-transformed by the coordinate transformation section. Also in this second aspect, it can be accurately judged whether or not an obstacle exists within the lower-side judgment area using the lower traveling body as a reference in the unified coordinate system, that is, the coordinate system using the upper revolving body as a reference.

In the case where the work machine includes a traveling drive device that makes the lower traveling body perform a traveling motion, it is preferable that the safety operation command section is configured to output, as the safety operation command, a traveling motion restriction command for restricting the traveling motion of the lower traveling body in a direction in which the lower traveling body approaches the obstacle (e.g., a command for decelerating or stopping the traveling motion). Alternatively, in the case where the work machine includes an alarm device capable of performing an alarm operation to the operator, the safety operation command section may be configured to output, as the safety operation command, an alarm command for making the alarm device perform an alarm operation.

The invention claimed is:

1. A safety apparatus installed on a work machine including a lower traveling body capable of traveling on the ground and an upper revolving body mounted on the lower traveling body so as to be revolvable, the safety apparatus comprising:
   an obstacle sensor provided in a specific portion of the upper revolving body to detect an obstacle around the work machine;
   a revolving angle detector that detects a revolving angle of the upper revolving body relative to the lower traveling body;
   an upper-side coordinate position calculation section that calculates an upper-side coordinate position that is a position of the obstacle detected by the obstacle sensor, the position being a position in a coordinate system using the upper revolving body as a reference;
   a lower-side judgment area setting section that sets a lower-side judgment area for judging an approach of the obstacle at least in a periphery of the lower traveling body using the lower traveling body as a reference;
   a coordinate transformation section that transforms one position of the upper-side coordinate position and a position of the lower-side judgment area into a position in a coordinate system to which the other position of the upper-side coordinate position and the position of the lower-side judgment area belongs, based on the revolving angle detected by the revolving angle detector, to thereby unify a coordinate system for specifying the position of the obstacle and a coordinate system for specifying the position of the lower-side judgment area;
   a lower-side approach judgment section that judges whether or not the obstacle exists within the lower-side judgment area in the coordinate system unified by the coordinate transformation section; and
   a safety operation command section that outputs a safety operation command for making the work machine perform a safety operation when the lower-side approach judgment section judges that the obstacle exists within the lower-side judgment area,
   wherein: the coordinate transformation section is configured to transform the upper-side coordinate position into a lower-side coordinate position using the lower traveling body as a reference; the lower-side approach judgment section is configured to judge whether or not the lower-side coordinate position is a position within the lower-side judgment area; and the safety operation command section is configured to output the safety operation command when the lower-side approach judgment section judges that the lower-side coordinate position is a position within the lower-side judgment area, and
   wherein the work machine further includes a traveling drive device that makes the lower traveling body perform a traveling action, and the safety action command section is configured to output, as the safety action command, a traveling motion restriction command for restricting the traveling motion of the lower traveling body in a direction in which the lower traveling body approaches the obstacle.

2. The safety apparatus of the work machine according to claim 1, further comprising: an upper-side judgment area setting section that sets an upper-side judgment area for judging the approach of the obstacle to the upper revolving body around the upper revolving body using the upper revolving body as a reference; and an upper-side approach judgment section that judges whether or not the upper-side coordinate position is a position within the upper-side judgment area, wherein the safety operation command section is configured to output the safety operation command also when the upper-side approach judgment section judges that the upper-side coordinate position is a position within the upper-side judgment area.

3. The safety apparatus of the work machine according to claim 1, wherein: the lower-side judgment area setting section is an overall judgment area setting section that sets an overall judgment area, as the lower-side judgment area, around both the lower traveling body and the upper revolving body based on the revolving angle detected by the revolving angle detector; the lower-side approach judgment section is an overall approach judgment section that judges whether or not the lower-side coordinate position is a position within the overall judgment area; and the safety operation command section is configured to output the safety operation command when the overall approach judgment section judges that the lower-side coordinate position is a position within the overall judgment area.

4. The safety apparatus of the work machine according to claim 1, wherein the work machine further includes an alai in device capable of performing an alarm operation to an operator, and the safety operation command section is configured to output, as the safety operation command, an alarm command for making the alarm device perform the alarm operation.

* * * * *